UNITED STATES PATENT OFFICE.

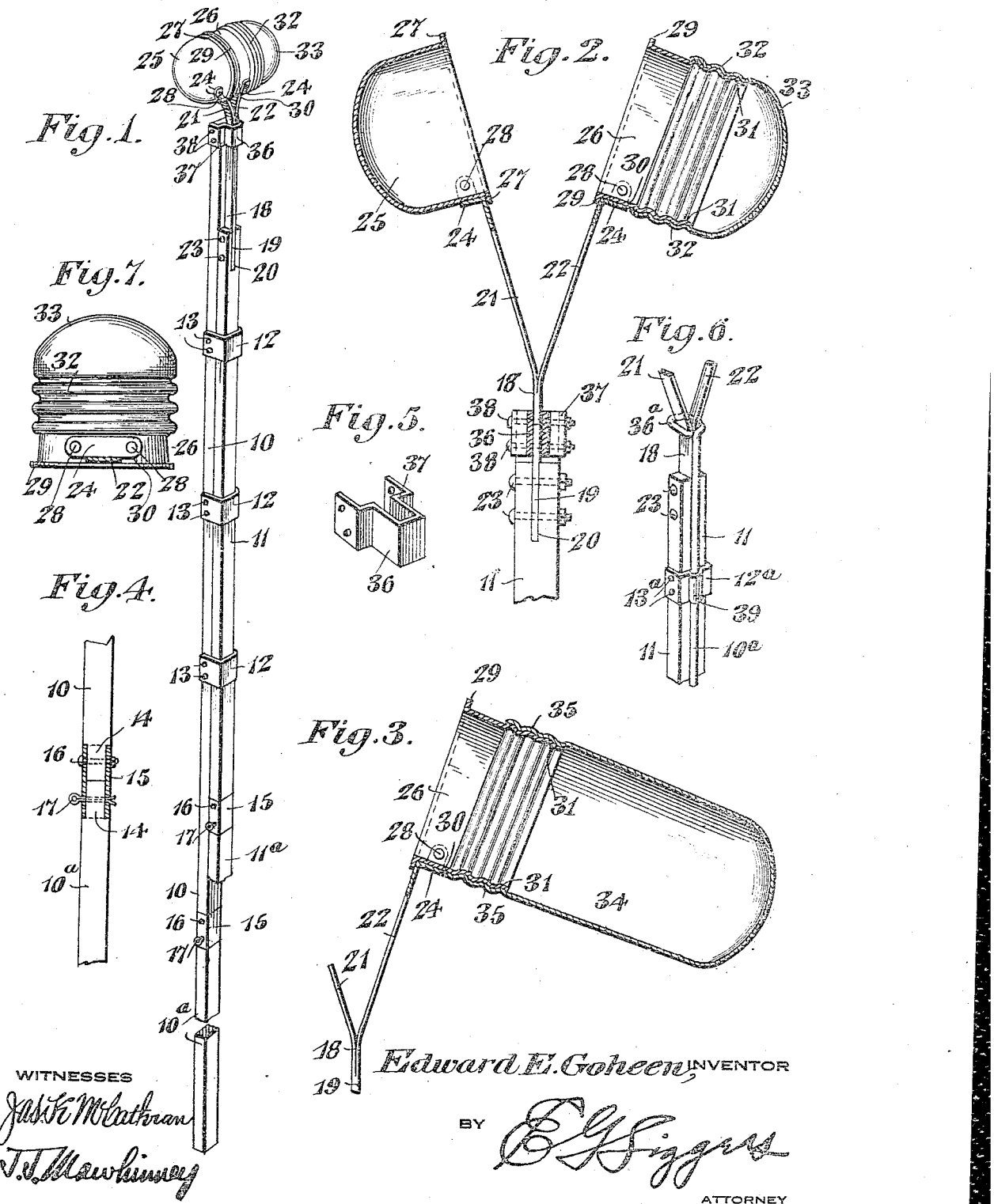

EDWARD EARL GOHEEN, OF JACKSONVILLE, ILLINOIS.

FRUIT-PICKER.

1,245,155.  Specification of Letters Patent.  Patented Nov. 6, 1917.

Application filed March 10, 1916. Serial No. 83,353.

*To all whom it may concern:*

Be it known that I, EDWARD E. GOHEEN, a citizen of the United States, residing at Jacksonville, in the county of Morgan and State of Illinois, have invented a new and useful Fruit-Picker, of which the following is a specification.

The present invention relates to an improvement in fruit pickers, and has for an object to provide an improved structure of this character which prevents the bruising or injuring of the fruit, and the catching or hooking of the device in the branches of trees, and the like, by providing a structure which has practically no projections, ropes, straps, or other members capable of being entangled in the branches; a device the head sections of which may be opened to any desired extent; and a device which may be operated by the natural movements of the hands in working the same up and down past each other.

Another object of this invention is to provide a device which comprises a pair of relatively slidable pole members, one of which carries a forked spring on which the head sections are mounted. The opposite member of this pole carries a sleeve, or the like, which moves upon the spring, and which, when the member is raised, slides up on the spring and compresses the forked end thereof, so as to close the head. This object contemplates a structure wherein ropes, cables, and the like, are done away with, and wherein the head sections may be opened or closed to any desired extent, and are positively operated by a simple mechanism, which may be easily inserted between the branches of a tree.

A still further object of the invention is to provide a device of this nature which has a pole or handle made of relatively slidable members, and wherein each one of these slidable members may be made of any number of detachable parts to admit of the lengthening or shortening of the pole or handle of the picker to adapt it for the various uses to which it may be applied; and to provide a device of this nature which has a detachable cup on one of the head sections, and an interchangeable receptacle to take the place of the cup when gathering small fruit, or the like. This object of the invention embraces a peculiar construction of the head section which carries the interchangeable receptacle and cup, for substantially and rigidly mounting this head section on one of the fork arms of the spring member.

Other objects and advantages of this invention will be clearly brought out in the following specific disclosure of the present preferred embodiment of the invention, the same being illustrated in the accompanying drawing, wherein—

Figure 1 is a perspective view of a fruit picker constructed according to this invention, the head being closed.

Fig. 2 is a longitudinal vertical section, taken through the head, and through the closing sleeve at the upper end of the handle or pole, the parts being enlarged to show clearly the structures of the same.

Fig. 3 is a view of one of the head sections secured to the adjacent fork arm of the spring, and showing the detachable receptacle mounted on the head section.

Fig. 4 is a detail fragmentary view of the meeting ends of two of the parts of the handle, by means of which the handle may be lengthened or shortened, the ferrule being shown in section.

Fig. 5 is a detail perspective view of the closing sleeve.

Fig. 6 is a detail perspective view of the upper end of the handle or pole, showing a slightly modified construction of the same.

Fig. 7 is a transverse sectional view, taken through one of the arms of the fork member and looking upwardly toward the under side of the adjacent head section with the detachable cup mounted thereon.

Referring to this drawing, wherein like parts are designated by similar numerals of reference throughout the several views, 10 and 11 designate the opposite pole or handle members, which are adapted for relative sliding movement longitudinally against each other. In Fig. 1, the member 10 is shown as provided with a plurality of straps 12 secured at 13 near their opposite ends to the opposite edges of the member 10, the straps 12 being substantially U-shaped, so as to conform to and snugly receive therein, the opposite member 11. The straps 12 are spaced apart longitudinally of the pole or handle throughout the length thereof, so as to securely unite the members 10 and 11, hold the same from swinging edgewise out of register, and to admit of the free and easy sliding movement of one member upon the other. As shown in Figs. 1 and 4, the handle members 10 and 11 may be made in any number of parts, which are detachably secured end to end, so as to lengthen or shorten the handle or pole. In Fig. 4, is shown in section, one of the connections in the member 10 of the handle. The upper or main part of the member 10 and the lower or detachable part 10ª are each reduced or rabbeted at their adjacent opposite ends, as at 14. A ferrule 15 fits snugly about the reduced or rabbeted portions 14 of the parts 10 and 10ª, so as to firmly hold the same together. Preferably the main member 10 has a permanent bolt 16 secured therethrough and through the upper surrounding end of the ferrule 15. The lower part 10ª, which, detachably engages in the lower end of the ferrule 15, is held in place by a cotter pin 17 secured detachably in edgewise relation through the ferrule 15 and the upper reduced extremity of the part 10ª. It is, of course, understood that this form of detachable connection between the parts 10 and 10ª may be modified, and it is also understood that the parts 11 and 11ª may be secured together as shown in Fig. 1, by the ferrule 15 of the same construction. Thus, the pole or handle of the device may be made as long or as short as is desired, so as to accommodate the picker of this invention to trees of different heights, or branches of different lengths, according to the position of the operator.

One of the handle or pole members, the member 11 being shown in the present instance, is provided upon its upper end with a spring 18 in the form of a relatively flat broad bar, the lower end 19 of which constitutes a shank, which is received in a transversely formed slot 20 in the upper end of the member 11, the slot 20 extending from the outer upper end of the member 11 inwardly. The upper end of the spring 18 is bifurcated or forked to provide a pair of resilient flaring fork arms 21 and 22. These arms 21 and 22 flare in an edgewise direction relatively to the member 11. The shank 19 is secured in the slot 20 by one or more bolts 23, or the like which are secured through the upper end of the member 11, as shown in Fig. 2.

The upper ends of these arms 21 and 22 are each provided with a strap 24 extending outwardly from each arm and at right angles thereto, as shown to advantage in Figs. 2, 3 and 7. Thus, the straps 24 provide, substantially, T-shaped heads upon the outer ends of the arms 21 and 22, which heads are turned over at right angles upon the ends of the arm.

The spring 18 carries a picker head, which is made in two sections, a section 25 carried upon the outer end of the arm 21, and a section 26 carried upon the outer end of the arm 22. The section 25 is in the form of a cup or relatively shallow receptacle having an outturned flange 27 at its marginal edge, which constitutes an abutting flange. This flange 27 seats against the inner face of the arm 21, while the outer cylindrical surface of the cup 25 rests upon the strap 24. The strap 24 is curved longitudinally to conform to the outer cylindrical surface of the cup 25, and has its opposite ends secured to the cup 25 by rivets 28, or the like, as shown in Figs. 2 and 7. Thus, the receptacle 25 is rigidly braced upon the outer end of the spring arm 21. The opposite head section 26 comprises a cylindrical body of substantially the same diameter from end to end, which is of substantial length, and which is open at its opposite ends. This cylindrical head section has an abutting flange 29 upon its inner edge which outstands therefrom and is adapted to meet and fit flat against the opposite abutting flange 27. The strap 24 of the arm 22 is curved longitudinally to lie flat against the smooth uninterrupted outer surface 30 of the cylinder 26, and immediately beyond the flange 29 to engage the flange 29 against the inner face of the arm 22. This structure of cylinder 26 and flange 29 provides a seat to receive and rigidly hold and brace the upper end of the arm 22 and its strap 24. The outer end 31 of the cylinder 29 is threaded and is adapted for engagement with the threaded outer end 32 of a cup 33. The cups 25 and 33 are adapted to coöperate to retain fruit therein when the sections are brought together and to prevent the falling of the fruit on the ground when it is broken from the limb.

When the improved device is used for picking small fruit, or the like, a receptacle 34, shown in Fig. 3, may be substituted on the section 26, in lieu of the cap 33. This receptacle 34 is of the same general form of the cap 33, but is considerably deeper, to accommodate a larger quantity of fruit, which may be gathered and retained in the receptacle 34. The receptacle 34 becomes part of the head when applied to the section 26, and may be held so as to incline or hang downwardly to retain the fruit therein. The receptacle 34 has a threaded outer end 35 adapted for engagement over the threaded end 31 of the cylindrical section 26.

The present invention provides a positive means for closing the head, and a means which has no flexible parts or end projections liable to engage and be caught in the branches of trees, and the like, to hinder the successful operation and use of the device of this invention. This improved operating means comprises a sleeve 36, which stands out from a strap 37, secured to the opposite pole or handle member 10, in the present instance. As shown in Fig. 5, this sleeve 36 is relatively narrow, so as to snugly fit around the spring 18. The opposite ends of the strap are secured, as at 38, to the edges of the member 10 at the outer end or top, thereof, so that the sleeve 36 is movable with the member 10 and may thus be slid longitudinally upon the spring 18. The sleeve 36 is of such width that when the member 10 is moved outwardly or raised, the sleeve 36 moves over the forked outer end of the spring and compresses or contracts the arms 21 and 22 to bring the same together, and thus bring the sections 25 and 26 of the head into abutting or closed relation. By thus collapsing the arms 21 and 22, no projections, sharp edges, or the like are left exposed or extend from the sides of the picker. The device, therefore, may be very readily inserted and handled between branches and other confined places, where prior pickers cannot be practically employed.

In Fig. 6 a slight modification of this picker is shown. The handle member 11 is disclosed as supporting the spring 18 and in having secured thereto one or more straps 12ª. The straps 12ª are secured by rivets 13ª, or the like to the opposite edges of the member 11. The intermediate portion of the strap 12ª is arched outwardly to provide a longitudinally extending bearing sleeve 39 to slidably and snugly receive therethrough a rod 10ª. This rod 10ª takes the place of the handle or pole member 10, shown in Fig. 1, and is adapted to be slid longitudinally against the member 11. The upper end of the rod 10ª is looped and overturned to provide a laterally extending eye or sleeve 36ª, which snugly fits about the spring 18, and which, when the rod 10ª is slid upwardly, is adapted to move over the forked end of the spring and compress the arms 21 and 22 thereof.

In the use of this improved picker, the handle members 10 and 11 of the pole are slid against each other, so as to draw the sleeve 36 down against the top of the member 11, as shown in Fig. 2. The device is now extended or raised to engage the fruit between, or against one of, the head sections 25.

The device is held in this position and the handle members 10 and 11 are slid in an opposite direction, so as to slide the sleeve 36 outwardly upon the spring 18 and collapse the arms 21 and 22. The collapsing of the arms brings the head sections 25 and 26 together against the opposite sides of the fruit. The device may now be drawn inwardly, or downwardly, to pull the fruit from the branch. The cups 25 and 33 hold the fruit from falling to the ground or striking against the adjacent branches, and thus protect the fruit from being bruised or being lost.

When it is desired to pick small fruit, the cup 33 is unscrewed from the cylinder 26 and the receptacle 34 is screwed on the cylinder to take the place of the cup. The device is now used in the same way, holding the receptacle 34, however, in a downwardly inclined position, so that the fruit when picked will fall down toward the bottom of the receptacle 34 and be retained therein.

The section 26 of the head is in the form of a cylinder, so as to produce the relatively smooth uninterrupted outer face 30 at the inner end of the cylinder to receive thereagainst the adjacent strap 24, and to hold the upper end of the arm 22 against the outstanding flange 29. The structure provides a rigid connection between the arm 22 and the section 26. The cup 25 is similarly connected to the arm 21 to thus rigidly hold the cup 25 on the arm.

What is claimed is:—

1. A fruit picker comprising a pair of relatively slidable rigid handle members attached to each other, a spring mounted on one of the members and comprising outwardly diverging resilient arms, a pair of coöperating head sections engageable with each other and carried on the ends of said arms, and a sleeve carried by and rigid with the opposite handle member and adapted to surround the arms of the spring whereby the upward sliding movement of said opposite handle member compresses the arms of the spring and brings said head sections together.

2. A fruit picker comprising a pair of rigid handle members, spaced apart straps carried by one of said members and encircling the opposite member to connect the members together and permit relative sliding movement of the same, a spring secured to the upper end of one of said members, and having its upper end forked to provide a pair of outwardly diverging resilient arms, coöperating cups mounted on said arms and engageable with each other, and a sleeve rigid with and fixed to the opposite handle member at its outer end and fitting about said spring whereby the upward sliding movement of said opposite member moves said sleeve upwardly on the spring and contracts said arms and brings the cups together.

In testimony, that I claim the foregoing as my own, I have hereto affixed my signature in the presence of two witnesses.

EDWARD EARL GOHEEN.

Witnesses:
C. W. BOSTON,
LYCURGUS GOHEEN.